(12) United States Patent
Bello et al.

(10) Patent No.: US 8,990,541 B2
(45) Date of Patent: Mar. 24, 2015

(54) COMPACTING MEMORY UTILIZATION OF SPARSE PAGES

(75) Inventors: Adekunle Bello, Austin, TX (US);
Douglas Griffith, Georgetown, TX (US);
Angela Astrid Jaehde, Austin, TX (US);
Srinivasa Muppala Rao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 13/611,204

(22) Filed: Sep. 12, 2012

(65) Prior Publication Data

US 2014/0075148 A1 Mar. 13, 2014

(51) Int. Cl.
*G06F 12/10* (2006.01)

(52) U.S. Cl.
CPC .......... *G06F 12/1036* (2013.01); *G06F 12/109* (2013.01)
USPC .................. 711/206; 711/209; 711/E12.065; 711/E12.068; 711/E12.059

(58) Field of Classification Search
CPC .... G06F 12/10; G06F 12/109; G06F 12/1036
USPC .................. 711/206, 202, 203, 209, E12.065, 711/E12.066, E12.068, E12.059
See application file for complete search history.

(56) References Cited

U.S. PATENT DOCUMENTS

| | | | |
|---|---|---|---|
| 6,571,261 | B1 | 5/2003 | Wang-knop et al. |
| 8,015,220 | B1 | 9/2011 | Volkoff et al. |
| 8,041,877 | B2 * | 10/2011 | Nevarez et al. .................. 711/6 |
| 2009/0307439 | A1 | 12/2009 | Jacobs et al. |
| 2011/0022801 | A1 * | 1/2011 | Flynn ............................ 711/120 |
| 2011/0113183 | A1 | 5/2011 | Lee et al. |
| 2011/0167239 | A1 | 7/2011 | Horn et al. |
| 2011/0219172 | A1 | 9/2011 | Lin et al. |

OTHER PUBLICATIONS

Y. Kermarrec, et al., "Integrating Page Replacement in a Distributed Shared Virtual Memory," Distributed Computing Systems, 1994, Proceedings of the 14th International Conference, pp. 8.*
Ruth et al., Virtual Distributed Environments in a Shared Infrastructure; IEEE Computer, vol. 38 No. 5; May 2005.*

(Continued)

*Primary Examiner* — Pierre-Michel Bataille
(74) *Attorney, Agent, or Firm* — Garg Law Firm, PLLC; Rakesh Garg; Damion Josephs

(57) ABSTRACT

A method, system, and computer program product for improving memory utilization of sparse pages are provided in the illustrative embodiments. A set of virtual pages is identified. Each virtual page in the set of virtual pages is a sparse virtual page. The set of virtual pages includes a first sparse virtual page and a second sparse virtual page. At least a portion of data of the first sparse virtual page in the set of virtual pages is stored in a first physical page. The first physical page belongs to a set of consolidation physical pages, and the first physical page also stores at least a portion of the data of the second sparse virtual page. The first and the second sparse pages are mapped to the first physical page.

19 Claims, 10 Drawing Sheets

(56) References Cited

OTHER PUBLICATIONS

Yonezawa, N. et al, "Implementation and Evaluation of Distributed Shared Data Objects on a Workstation Cluster", IEEE Pacific Rim Conference on Communications, Computers, and Signal Processing, 1995, pp. 319-322.*

Ananthanarayanan, et al. "Experiences in Integrating Distributed Shared Memory with Virtual Memory Management," Operating Systems Review, vol. 26, No. 3, pp. 4-26, Jul. 1, 1992.*

* cited by examiner

COMPACTING MEMORY UTILIZATION OF SPARSE PAGES

BACKGROUND

1. Technical Field

The present invention relates generally to a method, system, and computer program product for memory management. More particularly, the present invention relates to a method, system, and computer program product for improving memory utilization of sparse pages.

2. Description of the Related Art

Data processing systems include memory devices for storing, processing, and moving data. A memory device, or physical memory, is generally a physical component of a data processing system configured to store data. Overall memory in a data processing system may also include logical components, such as a space on a hard disk designated to be used as a part of the system's memory.

A data processing system includes a set amount space in the physical memory. An operating system allows applications, processes, and threads (collectively, process) to access a portion of that physical memory for performing their functions.

Physical memory is addressed using physical addresses that point at locations in the physical memory. The physical addresses belong to a physical address space configured in the data processing system. A virtual address is an address that has to be mapped to a physical address to access the data stored in the location corresponding to the physical address.

A process executing in the data processing system does not reference the physical memory using physical addresses. The process can only use virtual addresses from a virtual address space that is specified and configured for use by the process. Other processes similarly use virtual addresses from other virtual address spaces to access physical memory.

The virtual address to physical address mapping allows an operating system, or a memory management subsystem thereof, to offer more memory in virtual form to the processes that execute in the data processing system than is physically available in the data processing system. Furthermore, the virtual address to physical address mapping allows an operating system, or a memory management subsystem thereof, to share some memory space amongst processes where the processes share common data, and keep the processes' individual data separate from other processes.

A page-size is a size of data that is read or written together into memory. When a process changes even a bit in a page, the entire page is deemed to have changed. When a process requests even a byte of data within a page the entire page has to be read from memory. If the page of the requested data is not available in memory, the memory management subsystem brings the entire page into memory from a secondary data storage unit, such as a hard disk drive, via a mechanism called page fault.

A commonly used page-size is 4 kilobytes (KB), which was established in the early days of computers, when physical memory available in computers was of the order of KB or megabytes (MB), significantly smaller than physical memories being configured in presently available computing systems. For example, presently, data processing systems having gigabytes (GB) of physical memory are commonplace, and systems with terabytes (TB) of physical memory are not uncommon. Modern operating systems allow addressing using addresses that are 64 bits long, allowing for pages that can be larger than 4 GB.

Pages or page frames of up to 4 KB are called small frames. Pages of size larger than 4 KB are called large frames. For example, some presently available data processing systems allow frames of 16 MB, which are four thousand times larger than the 4 KB small frames.

A process requests a page from a heap when the process needs memory to read or write data. A page in the heap is a virtual page. The size of virtual pages is determined by a configuration in the kernel, such as by a frame size parameter in the kernel. The virtual page maps to a physical page in physical memory via a page table. A process reads or writes data in the virtual page. The data is actually read or written in a physical page via the virtual page-physical page mapping in the page table.

SUMMARY

The illustrative embodiments provide a method, system, and computer program product for improving memory utilization of sparse pages. An embodiment identifies, using a processor, a set of virtual pages, wherein each virtual page in the set of virtual pages is a sparse virtual page, and wherein the set of virtual pages includes a first sparse virtual page and a second sparse virtual page. The embodiment stores at least a portion of data of the first sparse virtual page in the set of virtual pages in a first physical page, wherein the first physical page belongs to a set of consolidation physical pages, and wherein the first physical page also stores at least a portion of the data of the second sparse virtual page. The embodiment maps the first and the second sparse pages to the first physical page.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
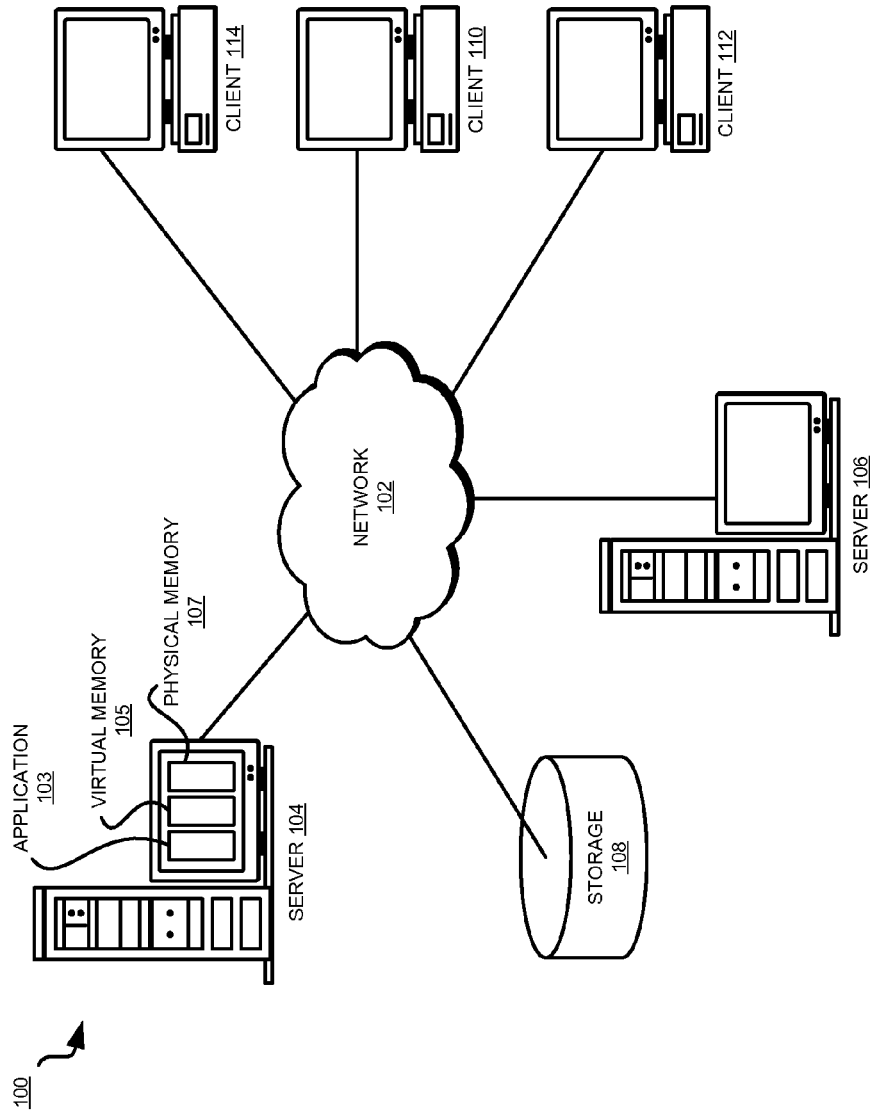
FIG. 1 depicts a pictorial representation of a network of data processing systems in which illustrative embodiments may be implemented.

The illustrative embodiments recognize that often a process does not fill the entire virtual page with data. In fact, a significant number of virtual pages, and therefore their corresponding physical pages, are very sparsely populated with valid data of the process. A sparse page, such as a sparse virtual page or a sparse physical page, is a page that is filled with valid data below a threshold percentage.

Thus, the majority of space in such sparse virtual and physical pages remains empty or populated with null or invalid data. The illustrative embodiments therefore recognize that sparse pages cause poor memory utilization in data processing systems.

With the cost of memory trending down, and the demand for memory trending up, modern systems include increasing amounts of physical memory. Modern systems are also increasingly employing larger frame sizes than before due to certain advantages associated with large frame sizes. The illustrative embodiments recognize that sparse pages exacerbate the poor memory utilization problem in systems that use large frames. In one example system, the physical memory had only 64 bytes of valid data per 64 K page, and this wasteful pattern repeated over 64 GB of available physical memory.

The illustrative embodiments used to describe the invention generally address and solve the above-described problems and other problems related to memory utilization in data processing systems. The illustrative embodiments provide a method, system, and computer program product for improving memory utilization of sparse pages.

Instead of one distinct sparse virtual page corresponding to one distinct physical page, as in the prior art, an embodiment consolidates valid data of several sparse virtual pages into one or more physical pages. The illustrative embodiments provide at least two methods for The illustrative embodiments are described with respect to certain thresholds only as examples. Such descriptions are not intended to be limiting on the invention. For example, an illustrative embodiment can be implemented with respect to any suitable thresholds for consolidation and non-consolidation in a similar manner within the scope of the illustrative embodiments.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
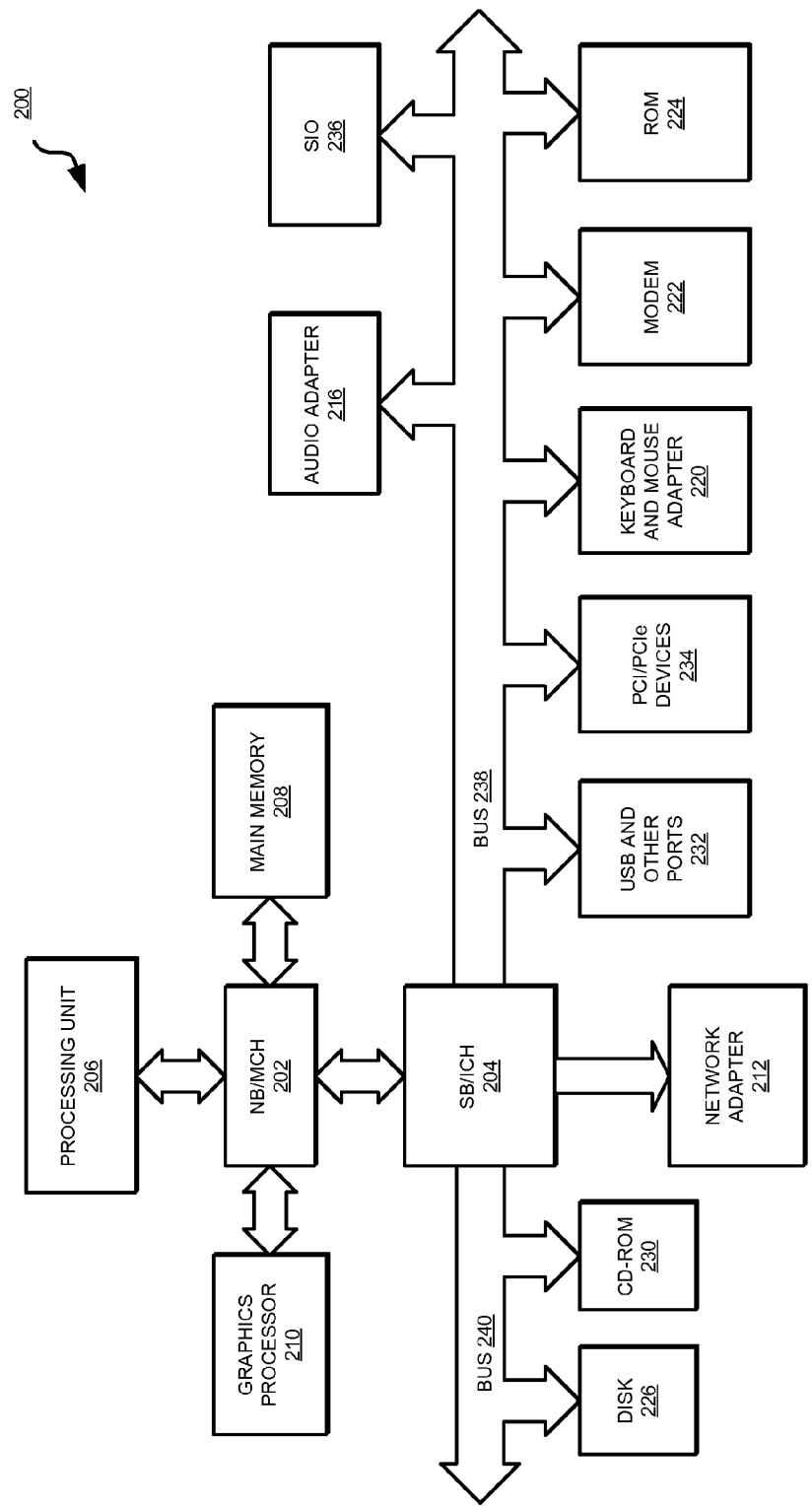
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that can be used in an embodiment. For example, server 104 includes application 103 that implements an embodiment. Virtual memory 105 in server 104 is the virtual memory, such as a heap, addressable by processes executing in data processing environment 100. Physical memory 107 in server 104 is the portion of the physical memory that is mapped to virtual memory 105 and is available to the processes.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 103 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent nonvolatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide nonvolatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIG. 12 and above-described examples are not meant to imply architectural limitations. For example, data processing system 200 also may be a tablet computer, laptop computer, or telephone device in addition to taking the form of a PDA.

Figure 3:
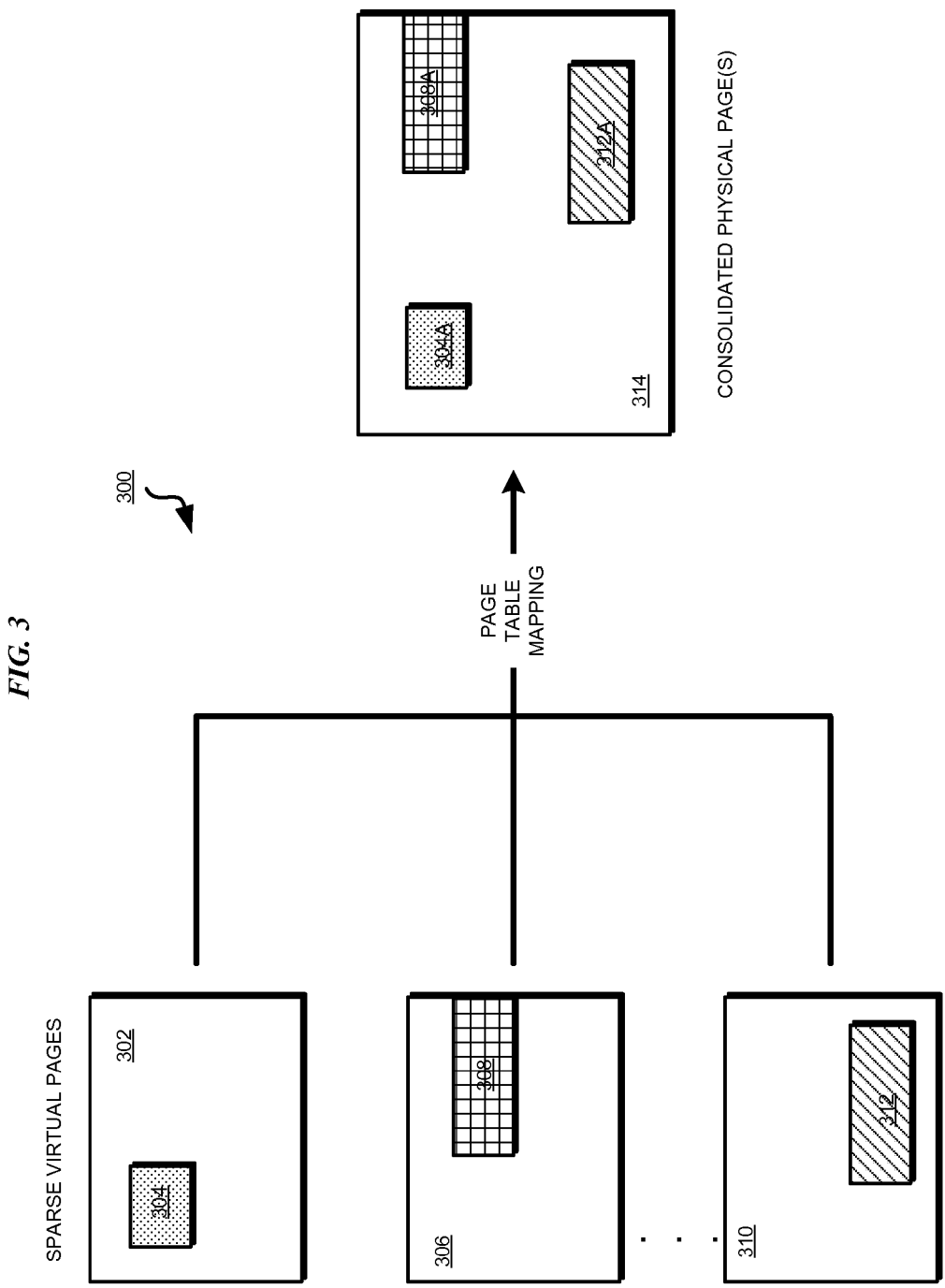
FIG. 3 depicts a block diagram of an example process of improving memory utilization of sparse pages in accordance with an illustrative embodiment.

With reference to FIG. 3, this figure depicts a block diagram of an example process of improving memory utilization of sparse pages in accordance with an illustrative embodiment. Configuration 300 can be implemented using virtual memory 105 and physical memory 107 in FIG. 1.

As an example, the virtual memory in configuration 300 includes some sparse virtual pages. For example, virtual page 302 includes data 304 that occupies less than a threshold percentage of space available in virtual page 302. The threshold percentage is also referred to herein as a consolidation threshold. Similarly, virtual page 306 also includes data 308 that occupies less than the consolidation threshold percentage of space available in virtual page 306. Virtual page 310 includes data 312 that also occupies less than the consolidation threshold percentage of space available in virtual page 310.

An embodiment, such as implemented in application 103 in FIG. 1, allocates physical page 314 for consolidating sparse data 304, 308, and 312 from virtual pages 302, 306, and 310 respectively. An embodiment may also use a previously allocated physical page as physical page 314. For example, if an iteration of the consolidation described in this disclosure were previously performed on sparse virtual pages, a consolidated physical page might already exist with some available space in which sparse data 304, 308, and 312 might fit.

The embodiment determines offsets and lengths of sparse data 304, 308, and 312 in their respective virtual pages 302, 306, and 310. The embodiment determines whether physical page 314 has spaces of those lengths available at those offsets. For example, if sparse data 304 were 32 bytes long and located at offset 100, the embodiment determines whether 32 bytes of free space is available at offset 100 in physical page 314.

If the required length is available at the required offset, the embodiment stores data 304 as data 304A at the same offset where data 304 appears in virtual page 302. In a similar manner, the embodiment determines space availabilities for data 308 and 312 in physical page 314 at their respective offsets and lengths in their corresponding virtual pages 306 and 310. If spaces of those lengths are available at those offsets in physical page 314, the embodiment stores data 308 and 312 as data 308A and 312A in physical page 314.

An embodiment modifies the page mappings of virtual pages 302, 306, and 310, such as in a page table. For example, if virtual page 302 were mapped to a physical page P1 (not shown), the embodiment maps virtual page 302 to physical page 314. Similarly, if virtual page 306 were mapped to a physical page P2 (not shown), the embodiment maps virtual page 306 to physical page 314, and if virtual page 310 were mapped to a physical page P3 (not shown), the embodiment maps virtual page 310 to physical page 314.

Operating in this manner, the embodiment consolidates data of three example sparsely populated virtual pages into one example consolidated physical page. Thus, the embodiment improves the memory utilization of the sparse virtual pages by using only one physical page instead of three, and using the one physical page—physical page 314—at a higher percentage for storing valid data.

Three example virtual pages 302, 306, and 310 are depicted only as a simplified example configuration for the clarity of the illustration and not to imply a limitation on the illustrative embodiments. Other virtual pages in the virtual memory may include more data than the consolidation threshold, less data than the consolidation threshold, or a combination thereof, and can be used with an embodiment in a similar manner.

Only one physical page 314 is also depicted as an example, and not to imply a limitation on the illustrative embodiments. For example, assume that physical page 314 did not have the space of the length of data 308 at the offset of data 308. An embodiment would allocate a new physical page (not shown) for use as a consolidated physical page, or identify another previously allocated consolidated physical page (not shown) and determine if the new or other consolidated physical page had the length available at that offset. Upon finding space of the length of data 308 at the offset of data 308 in the new or other consolidated physical page, the embodiment stores data 308 in the new or other consolidated physical page in a similar manner. In this manner, an embodiment consolidates sparse data from a set of sparse virtual pages into a smaller set of consolidated physical pages, thereby improving the memory utilization of the set of sparse virtual pages.

Figure 4:
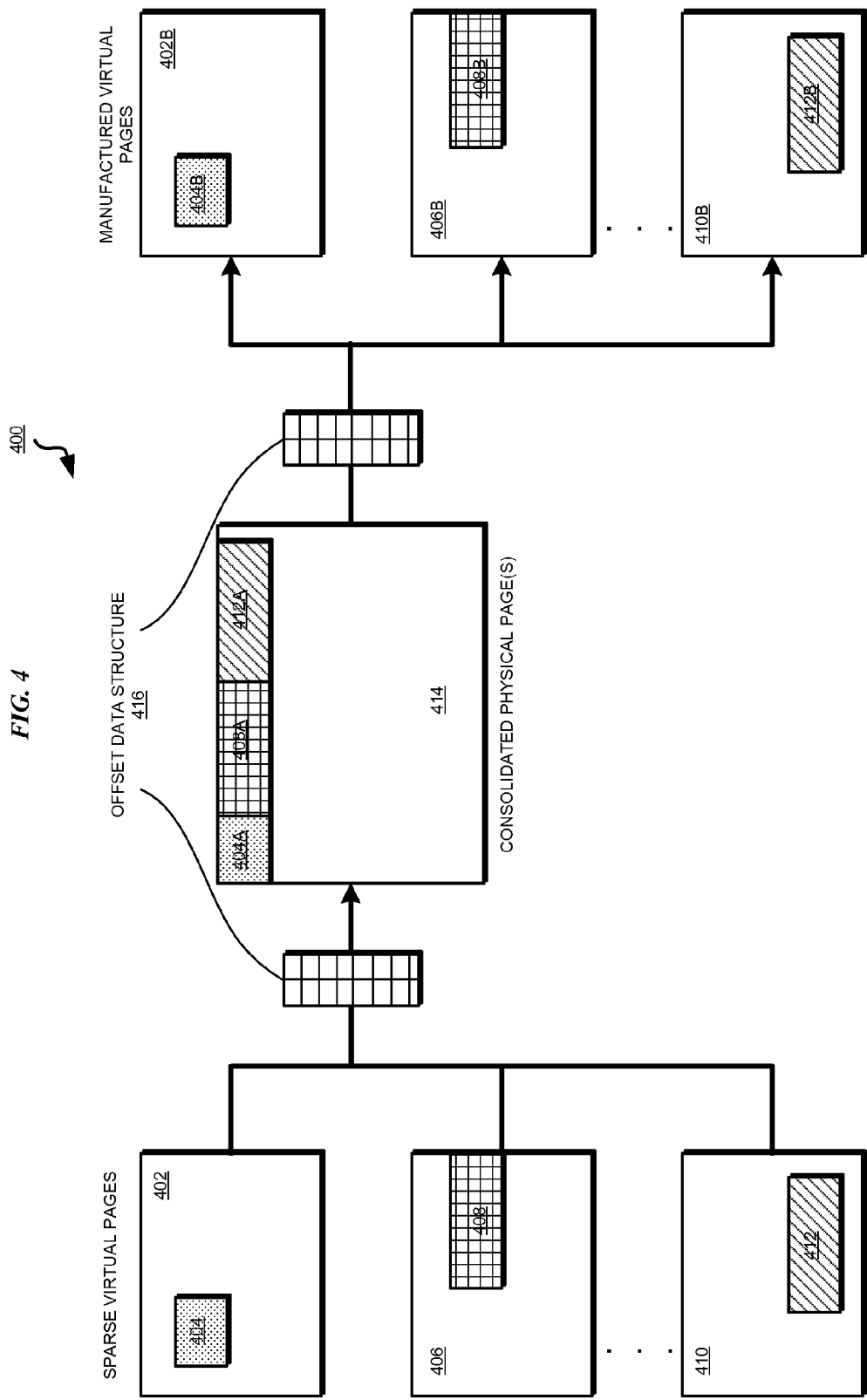
FIG. 4 depicts a block diagram of another example process of improving memory utilization of sparse pages in accordance with an illustrative embodiment.

With reference to FIG. 4, this figure depicts a block diagram of another example process of improving memory utilization of sparse pages in accordance with an illustrative embodiment. Configuration 400 can be implemented using virtual memory 105 and physical memory 107 in FIG. 1.

As an example, the virtual memory in configuration 400 includes some sparse virtual pages. For example, virtual page 402 includes data 404 that occupies less than a consolidation threshold percentage of space available in virtual page 402. Similarly, virtual page 406 also includes data 408 that occupies less than the consolidation threshold percentage of space available in virtual page 406. Virtual page 410 includes data 412 that also occupies less than the consolidation threshold percentage of space available in virtual page 410.

An embodiment, such as implemented in application 103 in FIG. 1, allocates physical page 414 for consolidating sparse data 404, 408, and 412 from virtual pages 402, 406, and 410 respectively. An embodiment may also use a previously allocated physical page as physical page 414. For example, if an iteration of the consolidation described in this disclosure were previously performed on sparse virtual pages, a consolidated physical page might already exist with some available space in which sparse data 404, 408, and 412 might fit.

The embodiment determines offsets and lengths of sparse data 404, 408, and 412 in their respective virtual pages 402, 406, and 410. The embodiment determines whether physical page 414 has spaces of those lengths available. For example, if sparse data 404 were 32 bytes long and located at offset 100, the embodiment determines whether 32 bytes of free space is available after any contiguous valid data in physical page 414.

If the required length is available in physical page 414, the embodiment stores data 404 as data 404A at an offset after previously stored valid data in physical page 414. In a similar manner, the embodiment determines space availabilities for data 408 and 412 in physical page 414 as next valid data 408A and 412A in the contiguous valid data of physical page 414.

An embodiment records consolidation information in offset data structure 416. For example, in one embodiment, offset data structure 416 includes the offset at which a sparse data appeared in a corresponding sparse virtual page and the offset where that sparse data was stored in a consolidated physical page. In another embodiment, the consolidation information may also include the length of that sparse data stored or consolidated in this manner.

In one embodiment, offset data structure 416 records the virtual page address and a pointer to the physical page used. The embodiment performs a lookup from a fault on the virtual page address to find offset data structure 416 based on this virtual address. The embodiment then uses the physical page pointer to find the data that the embodiment uses to make the manufactured page.

For example, for depicted configuration 400, in one embodiment, a consolidation information record in offset data structure includes an offset of data 404, offset of data 404A, and length of data 404. Another consolidation information record in offset data structure includes an offset of data 408, offset of data 408A, and length of data 408. Another consolidation information record in offset data structure includes an offset of data 412, and offset of data 412A.

An embodiment also modifies the page mappings of virtual pages 402, 406, and 410, such as in a page table. For example, if virtual page 402 were mapped to a physical page P1 (not shown), the embodiment maps virtual page 402 to physical page 414. Similarly, if virtual page 406 were mapped to a physical page P2 (not shown), the embodiment maps virtual page 406 to physical page 414, and if virtual page 410 were mapped to a physical page P3 (not shown), the embodiment maps virtual page 410 to physical page 414.

Assume that virtual page 406 and 410 are usable in a similar manner as virtual page 402 for the next part of the description of configuration 400. Assume that a process requests to access virtual page 402 after virtual page 402's data 404 has been consolidated as data 404A in physical page 414. An embodiment, such as in application 103 in FIG. 1, determines whether virtual page 404 exists at the time of the request. For example, a particular implementation may cache virtual page 404 for some time before virtual page 404 is purged from the cache due to non-activity.

If virtual page 404 exists at the time of the request, the embodiment simply uses the previously manufactured page from the cache and refreshes the cache entry.

Virtual page 404 may not exist at the time of the request. In such a case, an embodiment creates, or manufactures, a manufactured virtual page, e.g., virtual page 402B. The embodiment looks up offset data structure 416, determines the offset of data 404A, offset where data 404 resided in virtual page 402 (and therefore where data 404B should reside in manufactured virtual page 402B). Optionally, the embodiment also looks up a length of data 404A or data 404 in offset data structure 416. The embodiment populates manufactured virtual page 402B with data 404B using data 404A. Again, there may be multiple data offsets copied to this manufacture page. The process is then serviced using virtual page 402B in a known manner. An embodiment can perform similar determinations and operations with respect to virtual page 406 and 410 as well, when those pages are requested.

Operating in this manner, the embodiment consolidates data of three example sparsely populated virtual pages into one example consolidated physical page. Thus, the embodiment improves the memory utilization of the sparse virtual pages by using only one physical page instead of three, and using the one physical page—physical page 414—at a higher percentage for storing valid data.

Three example virtual pages 302, 306, and 310 are depicted only as a simplified example configuration for the clarity of the illustration and not to imply a limitation on the illustrative embodiments. Other virtual pages in the virtual memory may include more data than the consolidation threshold less data than the consolidation threshold, or a combination thereof, and can be used with an embodiment in a similar manner.

Only one physical page 314 is also depicted as an example, and not to imply a limitation on the illustrative embodiments. For example, assume that physical page 314 did not have the space of the length of data 308 at the offset of data 308. An embodiment would allocate a new physical page (not shown) for use as a consolidated physical page, or identify another previously allocated consolidated physical page (not shown) and determine if the new or other consolidated physical page had the length available at that offset. Upon finding space of the length of data 308 at the offset of data 308 in the new or other consolidated physical page, the embodiment stores data 308 in the new or other consolidated physical page in a similar manner. In this manner, an embodiment consolidates sparse data from a set of sparse virtual pages into a smaller set of consolidated physical pages, thereby improving the memory utilization of the set of sparse virtual pages.

Figure 5:
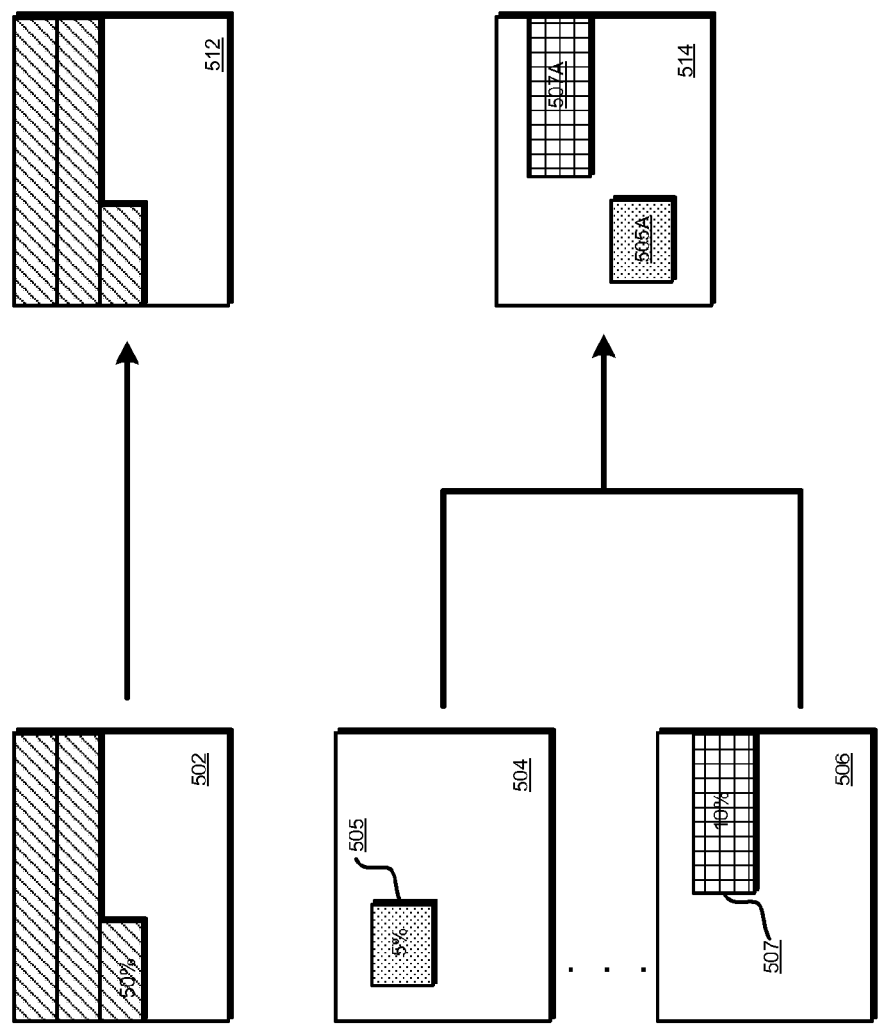
FIG. 5 depicts a block diagram of a configuration for selecting sparse pages for improving memory utilization of sparse pages in accordance with an illustrative embodiment.

With reference to FIG. 5, this figure depicts a block diagram of a configuration for selecting sparse pages for improving memory utilization of sparse pages in accordance with an illustrative embodiment. Configuration 500 can be implemented using virtual memory 105 and physical memory 107 in FIG. 1.

An embodiment uses a consolidation threshold to select virtual pages whose data should be consolidated. Only as an arbitrary example and without implying a limitation on the illustrative embodiments, assume that the consolidation threshold was set to twelve percent. In other words, if less than twelve percent of a virtual page includes valid data, that virtual page is a candidate for consolidation.

As depicted in FIG. 5, fifty percent of the space in virtual page 502 is occupied by valid data, five percent of the space in virtual page 504 is occupied by valid data, and ten percent of the space in virtual page 506 is occupied by valid data. Accordingly, an embodiment allows virtual page 502 to continue to map to physical page 512 as in the prior art, but selects virtual pages 504 and 506 for consolidation into physical page 514. Valid data 505 from virtual page 504 is consolidated with valid data 507 of virtual page 506 as data 505A and 507 respectively in physical page 514.

At some point during the operation of the data processing system where an embodiment is executing, a process that refers to virtual page 504 might add or manipulate data to virtual page 504. Consequently, data 505 may reach or exceed the consolidation threshold.

An embodiment detects a change in the utilization of virtual page 504, detects that data 505 has reached or exceeded the consolidation threshold, and performs an un-consolidation operation, i.e., removes virtual page 504 from being consolidated in consolidated physical page 514. The embodiment allocates a new physical page (not shown). The embodiment removes data 505A from physical page 514, and allows virtual page 504 to reference the newly allocated physical page where added or modified data 505 is now stored. The freed-up space in physical page 514 from removing data 505A can be reused for consolidating other sparse virtual pages.

Figure 6:
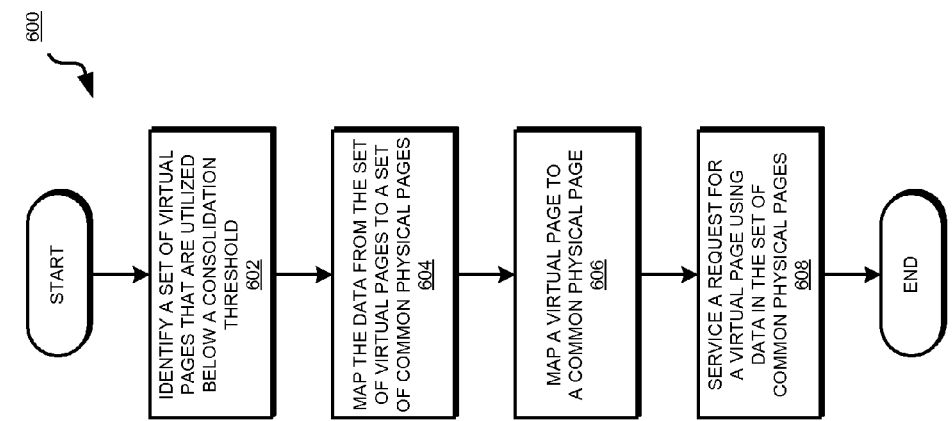
FIG. 6 depicts a flowchart of an example process for improving memory utilization of sparse pages in accordance with an illustrative embodiment.

With reference to FIG. 6, this figure depicts a flowchart of an example process for improving memory utilization of sparse pages in accordance with an illustrative embodiment. Process 600 can be implemented in application 103 in FIG. 1.

Process 600 begins by identifying a set of virtual pages, such as virtual pages 504 and 506 in FIG. 5, that are utilized below a consolidation threshold (step 602). Process 600 maps the data from the set of virtual pages identified in step 602 to a set of common or shared physical pages, e.g., consolidated physical page 514 in FIG. 5, consolidated physical page 414 in FIG. 4, or consolidated physical page 314 in FIG. 3 (step 604).

Process 600 maps a virtual page in the set of virtual pages to one or more physical pages in the set of common physical pages where the data of the virtual page is stored (step 606). Process 600 services a request for the virtual page of step 606 using data in the one or more physical pages of step 606 (step 608). Process 600 ends thereafter.

Figure 7:
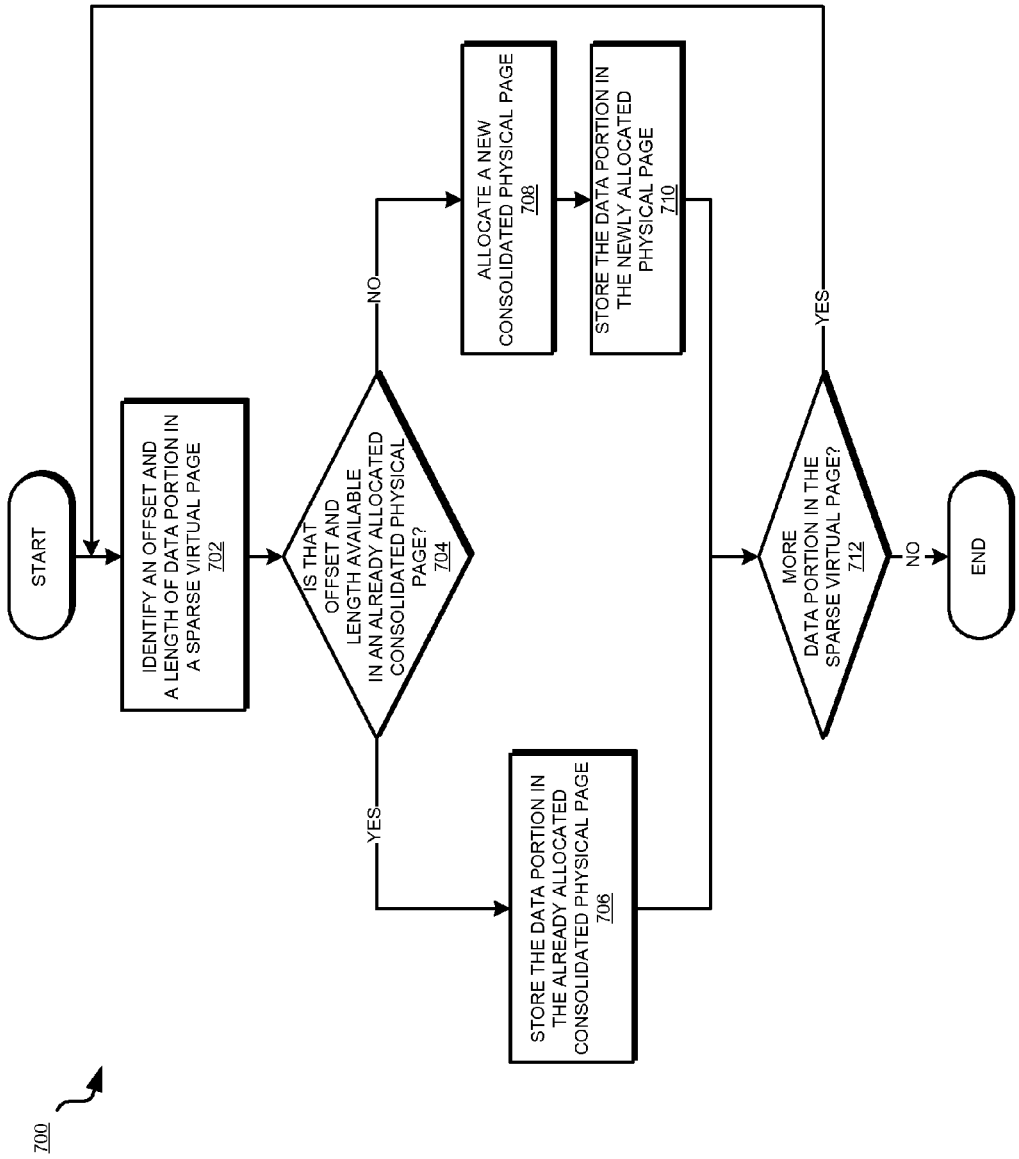
FIG. 7 depicts a flowchart of an example process of improving memory utilization of sparse pages in accordance with an illustrative embodiment.

With reference to FIG. 7, this figure depicts a flowchart of an example process of improving memory utilization of sparse pages in accordance with an illustrative embodiment. Process 700 can be implemented in application 103 in FIG. 1. Process 700 can be used in step 604 in FIG. 6.

Process 700 begins by identifying an offset and a length of a sparse data portion in a sparsely populated virtual page (step 702). For example, a sparse virtual page may have more than one data portions scattered within the virtual page, where the total space occupied by all data portions together still remains below a consolidation threshold.

Process 700 determines whether that offset address and an available length of space at that offset address is available in an already allocated consolidated physical page (step 704). If the offset and the length are available in an already allocated consolidated physical page ("Yes" path of step 704), process 700 stores the data portion at that offset and using that length of space in that already allocated consolidated physical page (step 706).

If the offset or the length or both are unavailable in an already allocated consolidated physical page ("No" path of step 704), process 700 allocates a new physical page for use as a consolidated physical page (step 708). Process 700 stores the data portion in the newly allocated consolidated physical page at the desired offset and using the desired length of space (step 710).

Process 700 determines whether more data portions remain in the sparse virtual page that have to be consolidated in this manner (step 712). If more data portions remain ("Yes" path of step 712), process 700 returns to step 702. Otherwise ("No" path of step 712), process 700 ends thereafter.

Figure 8:
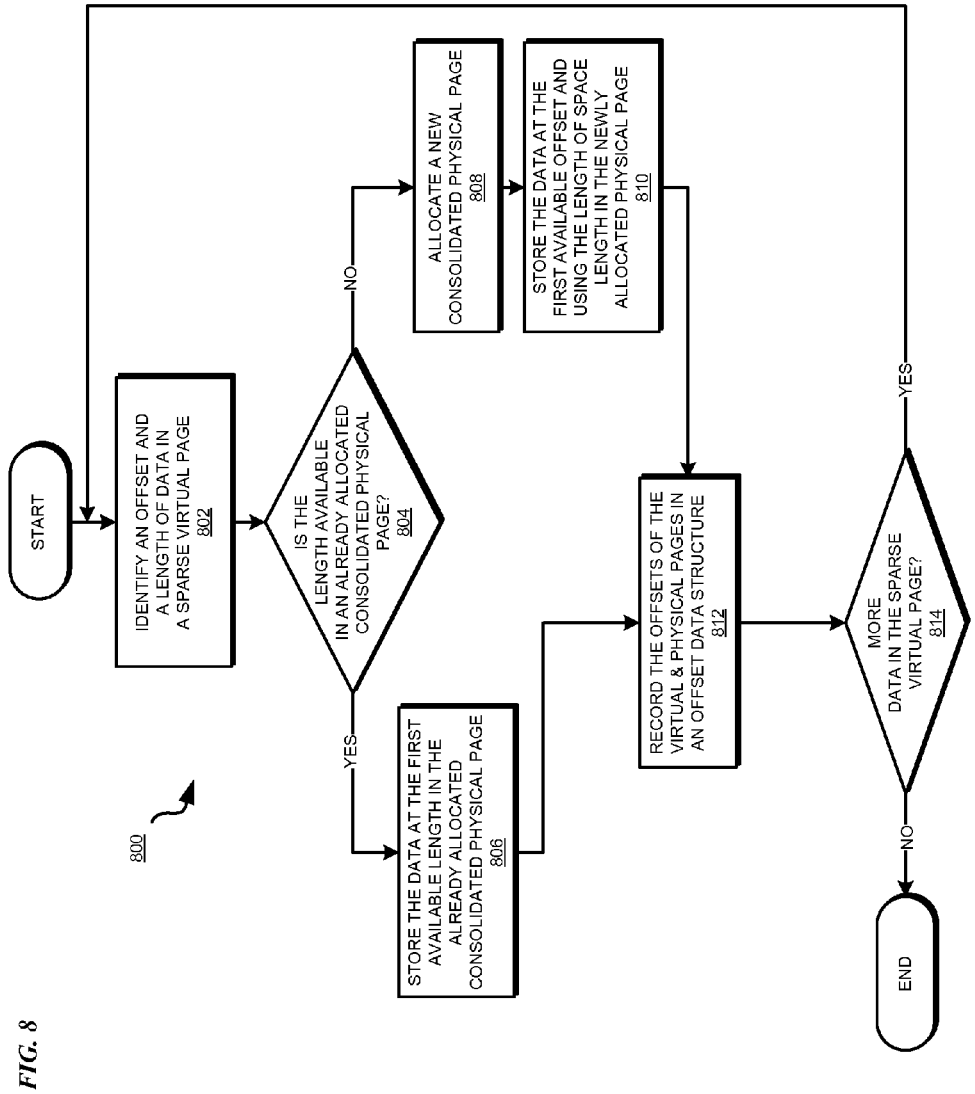
FIG. 8 depicts a flowchart of another example process of improving memory utilization of sparse pages in accordance with an illustrative embodiment.

With reference to FIG. 8, this figure depicts a flowchart of another example process of improving memory utilization of sparse pages in accordance with an illustrative embodiment. Process 800 can be implemented in application 103 in FIG. 1. Process 800 can be used as step 604 in FIG. 6.

Process 800 begins by identifying an offset and a length of a sparse data portion in a sparsely populated virtual page (step 802). Process 800 determines whether that length of space is available in an already allocated consolidated physical page (step 804). If the length is available in an already allocated consolidated physical page ("Yes" path of step 804), process 800 stores the data portion at the first available offset using that length of space in that already allocated consolidated physical page (step 806).

If the needed length of space is unavailable in an already allocated consolidated physical page ("No" path of step 804), process 800 allocates a new physical page for use as a consolidated physical page (step 808). Process 800 stores the data portion in the newly allocated consolidated physical page at the first available offset and using the desired length of space (step 810).

Process 800 records the offsets of the data portion in the virtual page and the physical page in an offset data structure (step 812). Optionally, process 800 may also record the length of the data portion in the offset data structure (not shown). Process 800 determines whether more data portions remain in the sparse virtual page that have to be consolidated in this manner (step 814). If more data portions remain ("Yes" path of step 814), process 800 returns to step 802. Otherwise ("No" path of step 814), process 800 ends thereafter.

Figure 9:
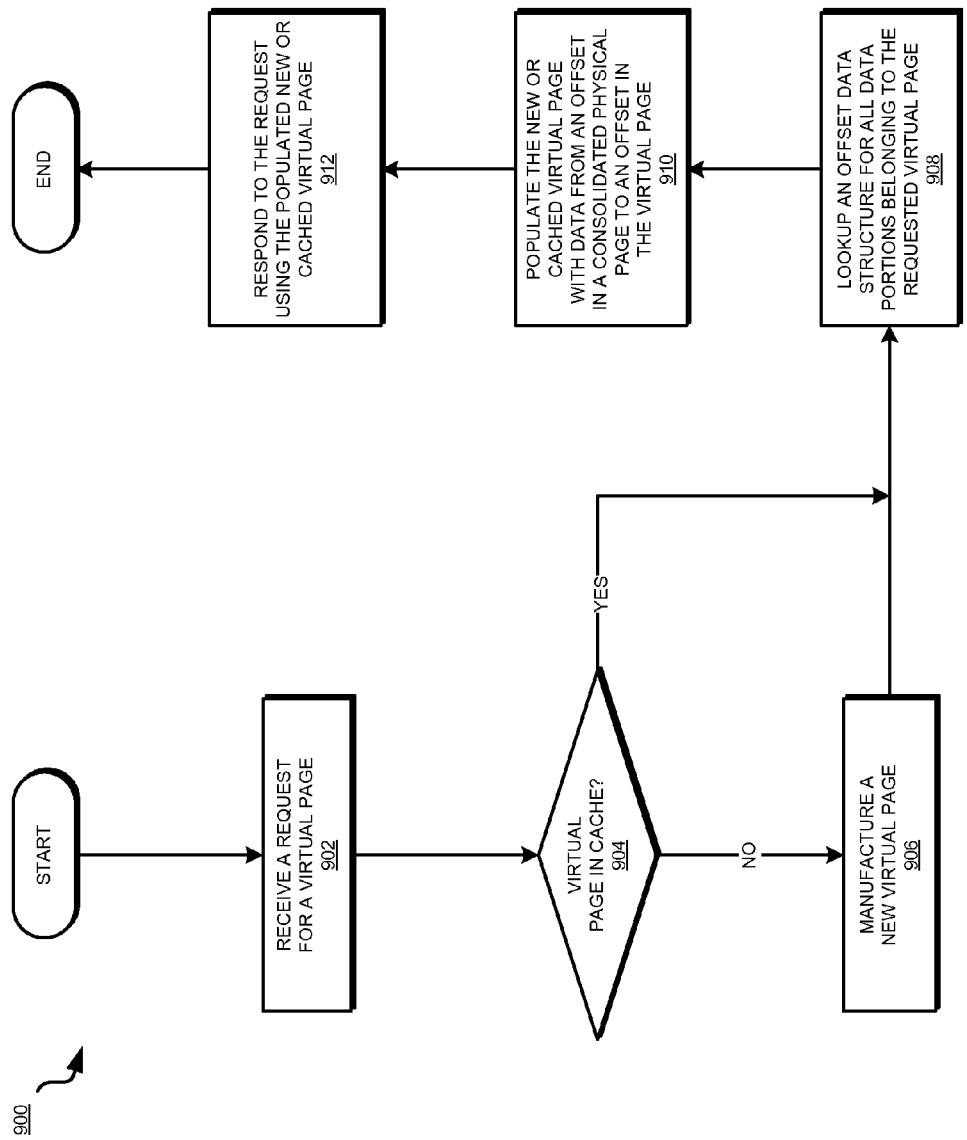
FIG. 9 depicts a flowchart of an example process for responding to a request for a virtual page that has been consolidated in accordance with an illustrative embodiment.

With reference to FIG. 9, this figure depicts a flowchart of an example process for responding to a request for a virtual page that has been consolidated in accordance with an illustrative embodiment. Process 900 can be implemented in application 103 in FIG. 1.

Process 900 begins by receiving a request for a virtual page (step 902). The requested virtual page has been consolidated in accordance with an embodiment, such as by using process 700 or 800 in FIG. 7 or 8, respectively.

Process 900 determines whether the requested virtual page is still available, such as in a hardware cache (step 904). If the requested virtual page is not available ("No" path of step 904), process 900 manufactures a new virtual page (step 906). If the requested virtual page is available ("Yes" path of step 904), process 900 skips step 906.

Process 900 looks-up an offset data structure for all data portions belonging to the requested virtual page (step 908). The lookup provides process 900 source offsets for one or more data portions in a consolidated physical page, target offsets for the one or more data portions in a virtual page, and optionally the length of the one or more data portion. Process 900 populates the new or cached virtual page with the one or more data portions using the offset information (step 910). Process 900 responds to the request of step 902 using the populated new or cached virtual page (step 912). Process 900 ends thereafter.

Figure 10:
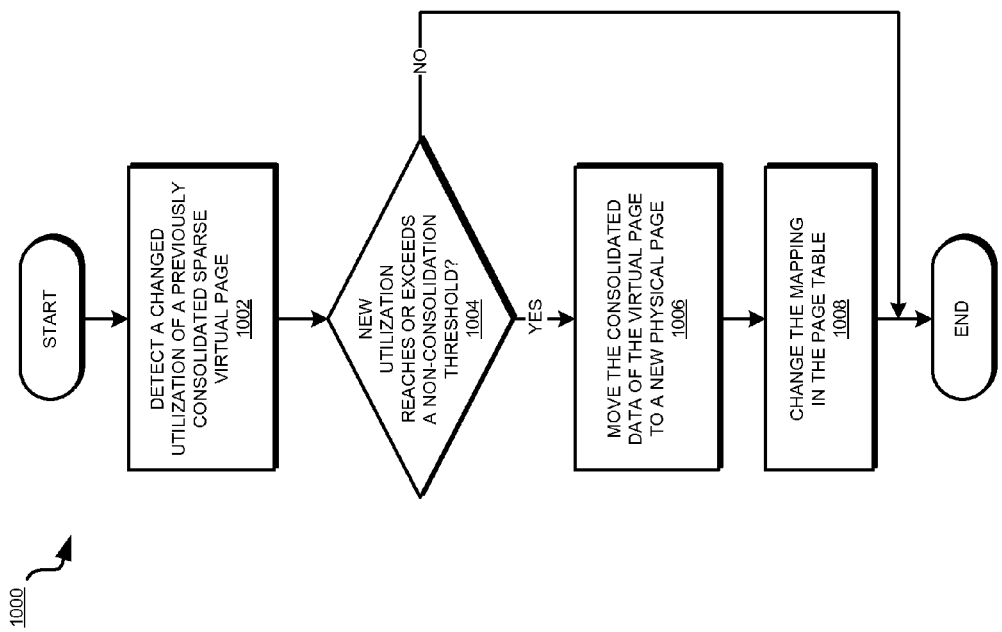
FIG. 10 depicts a flowchart of an example process of un-consolidating previously consolidated virtual pages in accordance with an illustrative embodiment.

With reference to FIG. 10, this figure depicts a flowchart of an example process of un-consolidating previously consolidated virtual pages in accordance with an illustrative embodiment. Process 1000 can be implemented in application 103 in FIG. 1.

Process 1000 begins by detecting a change in the utilization of a previously consolidated virtual page (step 1002). Process 1000 determines whether the new utilization reaches or exceeds an un-consolidation threshold (step 1004). If the new utilization remains below the un-consolidation threshold ("No" path of step 1004), process 1000 ends thereafter.

If the new utilization reaches or exceeds the un-consolidation threshold ("Yes" path of step 1004), process 1000 moves the consolidated data of the previously consolidated virtual page to a new physical page (step 1006). Process 1000 may allocate the new physical page (not shown) before moving the data in step 1006. Process 1000 changes a mapping of the virtual page to the new physical page, such as in a page table (step 1008). Process 1000 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for improving memory utilization of sparse pages. Using an embodiment, the utilization of a physical memory can be improved by consolidating sparse data from a set of several sparsely populated virtual pages into a smaller set of physical pages. An embodiment manipulates the mappings between the sparsely populated virtual pages and physical pages to reference the consolidated physical pages. An embodiment reconstructs or recreates a virtual page in the set of sparsely populated virtual pages, when a request to use the virtual page is received.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A data processing system for improving memory utilization of sparse pages, the data processing system comprising:

a storage device including a storage medium, wherein the storage device stores computer usable program code; and a processor, wherein the processor executes the computer usable program code, and wherein the computer usable program code comprises:

computer usable code for identifying, using a processor, a set of virtual pages, wherein each virtual page in the set of virtual pages is a sparse virtual page, and wherein the set of virtual pages includes a first sparse virtual page and a second sparse virtual page;

computer usable code for storing at least a portion of data of the first sparse virtual page in the set of virtual pages in a first physical page, wherein the first physical page belongs to a set of consolidation physical pages, and wherein the first physical page also stores at least a portion of the data of the second sparse virtual page, wherein the computer usable code for storing at least the portion of data of the first sparse virtual page further comprises:

computer usable code for determining an offset in the first sparse virtual page where the portion of data begins;

computer usable code for determining a length of the portion of data;

storing the portion of data at an offset in the first physical page such that the offset in the first physical page is the same as the offset in the first sparse virtual page; and computer usable code for using, starting at the offset in the first physical page, a length of space in the first physical page such that the length of space in the first physical page is the same as the length of the portion of data; and computer usable code for mapping the first and the second sparse pages to the first physical page.

2. A computer implemented method for improving memory utilization of sparse pages, the method comprising:

identifying, using a processor, a set of virtual pages, wherein each virtual page in the set of virtual pages is a sparse virtual page, and wherein the set of virtual pages includes a first sparse virtual page and a second sparse virtual page;

storing at least a portion of data of the first sparse virtual page in the set of virtual pages in a first physical page, wherein the first physical page belongs to a set of consolidation physical pages, and wherein the first physical page also stores at least a portion of the data of the second sparse virtual page, wherein storing at least the portion of data of the first sparse virtual page further comprises:

determining an offset in the first sparse virtual page where the portion of data begins;

determining a length of the portion of data;

storing the portion of data at an offset in the first physical page such that the offset in the first physical page is the same as the offset in the first sparse virtual page; and using, starting at the offset in the first physical page, a length of space in the first physical page such that the length of space in the first physical page is the same as the length of the portion of data; and mapping the first and the second sparse pages to the first physical page.

3. The computer implemented method of claim 2, further comprising: evaluating whether the length of space in the first physical page is available at the offset in the first physical page, wherein the storing and the using is responsive to the evaluating being affirmative.

4. The computer implemented method of claim 2, wherein storing a second portion of data of the first sparse virtual page comprises:

determining a second offset in the first sparse virtual page where the second portion of data begins;

determining a length of the second portion of data;

evaluating whether a second length of space in the first physical page is available at a second offset in the first physical page, wherein the second offset in the first physical page is the same as the second offset in the first sparse virtual page;

storing, responsive to the evaluating being negative, the second portion of data in a second physical page at an offset equal to the offset in the first sparse virtual page; and using, starting at the offset in the second physical page, a length of space in the second physical page such that the length of space in the second physical page is the same as the length of the second portion of data.

5. The computer implemented method of claim 4, wherein the second physical page is allocated responsive to the evaluating being negative, and wherein the second physical page is added to the set of consolidated physical pages.

6. The computer implemented method of claim 4, wherein the second physical page is selected from the set of consolidated physical pages responsive to the evaluating being negative.

7. The computer implemented method of claim 2, wherein storing at least the portion of data of the first sparse virtual page further comprises:

determining an offset in the first sparse virtual page where the portion of data begins;

determining a length of the portion of data;

storing the portion of data at a first available offset in the first physical page;

using, starting at the first available offset in the first physical page, a length of space in the first physical page such that the length of space in the first physical page is the same as the length of the portion of data; and recording, in a data structure, the offset in the first sparse virtual page and the first available offset in the first physical page.

8. The computer implemented method of claim 7, further comprising:

recording the length of the portion of data in the data structure.

9. The computer implemented method of claim 7, further comprising:

evaluating whether the length of space in the first physical page is free at the first available offset in the first physical page, wherein the first physical page includes a single contiguous block of data, wherein the first available offset is a location in the first physical page after the contiguous block of data ends in the first physical page, and wherein the storing and the using is responsive to the evaluating being affirmative.

10. The computer implemented method of claim 2, wherein storing a second portion of data of the first sparse virtual page comprises:

determining a second offset in the first sparse virtual page where the second portion of data begins;

determining a length of the second portion of data;

evaluating whether a second length of space in the first physical page is available at a second available offset in the first physical page, wherein the first physical page includes a single contiguous block of data, wherein the second offset in the first physical page is a location in the first physical page after the contiguous block of data ends in the first physical page;

storing, responsive to the evaluating being negative, the second portion of data at a first available offset in the second physical page;

using, starting at the first available offset in the second physical page, a length of space in the second physical page such that the length of space in the second physical page is the same as the length of the second portion of data; and recording, in a data structure, the second offset in the first sparse virtual page and the first available offset in the second physical page.

11. The computer implemented method of claim 10, wherein the second physical page is allocated responsive to the evaluating being negative, and wherein the second physical page is added to the set of consolidated physical pages.

12. The computer implemented method of claim 2, further comprising:
receiving a request for the first sparse virtual page;
evaluating whether the first sparse virtual page is in cache when the request is received;
creating, responsive to the evaluating being negative, a new virtual page, the new virtual page forming a manufactured virtual page;
populating the manufactured virtual page with the portion of data from the first physical page.

13. The computer implemented method of claim 12, further comprising:
performing a lookup of a data structure, the data structure storing an offset of the portion of data in the first sparse virtual page and an offset of the portion of data in the first physical page, wherein the populating comprises:
writing the portion of data from the offset in the first physical page to an offset in the manufactured virtual page such that the offset in the manufactured virtual page is the same as the offset in the first sparse virtual page.

14. The computer implemented method of claim 2, further comprising:
receiving a request for the first sparse virtual page;
evaluating whether the first sparse virtual page is in cache when the request is received;
updating, responsive to the evaluating being affirmative, the first sparse virtual page with the portion of data from the first physical page.

15. The computer implemented method of claim 2, wherein a sparse virtual page includes less than a threshold amount of data, wherein the threshold is a percentage value, the threshold forming a consolidation threshold.

16. The computer implemented method of claim 2, wherein the set of consolidated physical pages is smaller than the set of virtual pages, and wherein the mapping the first and the second sparse pages to the first physical page occurs in a page table.

17. A computer usable program product comprising a computer usable storage medium including computer usable code for improving memory utilization of sparse pages, the computer usable code comprising:
computer usable code for identifying, using a processor, a set of virtual pages, wherein each virtual page in the set of virtual pages is a sparse virtual page, and wherein the set of virtual pages includes a first sparse virtual page and a second sparse virtual page;
computer usable code for storing at least a portion of data of the first sparse virtual page in the set of virtual pages in a first physical page, wherein the first physical page belongs to a set of consolidation physical pages, and wherein the first physical page also stores at least a portion of the data of the second sparse virtual page, wherein the computer usable code for storing at least the portion of data of the first sparse virtual page further comprises:
computer usable code for determining an offset in the first sparse virtual page where the portion of data begins;
computer usable code for determining a length of the portion of data;
storing the portion of data at an offset in the first physical page such that the offset in the first physical page is the same as the offset in the first sparse virtual page; and
computer usable code for using, starting at the offset in the first physical page, a length of space in the first physical page such that the length of space in the first physical page is the same as the length of the portion of data; and
computer usable code for mapping the first and the second sparse pages to the first physical page.

18. The computer usable program product of claim 17, wherein the computer usable code is stored in a computer readable storage medium in a data processing system, and wherein the computer usable code is transferred over a network from a remote data processing system.

19. The computer usable program product of claim 17, wherein the computer usable code is stored in a computer readable storage medium in a server data processing system, and wherein the computer usable code is downloaded over a network to a remote data processing system for use in a computer readable storage medium associated with the remote data processing system.

* * * * *